UNITED STATES PATENT OFFICE.

FRANCIS X. GOVERS, OF OWEGO, NEW YORK, ASSIGNOR TO AMERICUS MANUFACTURING COMPANY, OF NEW YORK, N. Y., A CORPORATION OF NEW YORK.

WATERPROOF COATING AND METHOD OF MAKING SAME.

No. 800,144.     Specification of Letters Patent.     Patented Sept. 26, 1905.

Application filed September 6, 1904. Serial No. 223,462.

*To all whom it may concern:*

Be it known that I, FRANCIS X. GOVERS, a citizen of the United States, residing at Owego, in the county of Tioga and State of New York, have invented new and useful Improvements in Waterproof Coatings and Methods of Making the Same, of which the following is a specification.

This invention relates to the art of coating paper, cloth, and the like, and in its preferred embodiment has for its particular object to produce a waterproof-coated paper which will have a smooth finish and a high degree of luster and whose coating will not interfere with such paper taking printing-ink uniformly and well.

In coating paper with other glazes, enamels, or waterproofing composition than that herein described it has been found that the treated paper has either been defective as regards luster or as regards its capability for taking printing-ink. Printing upon such of the coated papers above referred to as are not defective in respect of the first-mentioned quality has been found to be lacking in uniformity either as regards the depth of color or the luster of the ink, or both, such printing exhibiting dull spots in the work, which defect has not been heretofore avoided except by following the practice of the invention as herein described and claimed.

In the practice of my invention I dissolve casein in a volatile solvent, preferably ammonium hydrate, employing for producing my preferred form of coating about ten parts, by weight, of casein to twenty parts, by weight, of ammonia of the commercial strength commonly used in this art. To this solution I add about sixty parts, by weight, of a base comprising a calcium compound, preferably precipitated calcium sulfate, (satin white,) and about two parts, by weight, of wax, preferably a saponified wax, as saponified carnauba, japan, or bees wax. My composition is now applied to the paper to be coated therewith in the usual or in any desired manner and is subjected to a temperature of 110° Fahrenheit or above. The volatile solvent is driven off preferably at or above the temperature stated. The resulting composition and the paper coated therewith have the qualities and advantages hereinbefore mentioned.

It is to be understood that my invention is not limited to the specific proportions of the ingredients mentioned nor to the exact temperature stated, as both may be modified within the scope of the appended claims without departing from the spirit of my invention or sacrificing any of the advantages thereof. It is further to be understood that my process as hereinafter defined is not departed from by the substitution of known equivalents of the materials which I employ.

Having thus described my invention, what I claim as novel, and desire to secure by Letters Patent, is—

1. In the process of producing a paper-coating and the like, the steps of heating together a calcium salt, wax and casein dissolved in ammonium hydrate to a temperature of or above 110° Fahrenheit and drying the resulting product.

2. The process of producing a paper-coating which consists in dissolving casein in ammonium hydrate, adding wax and calcium sulfate thereto, applying the same to the fabric to be coated therewith and evaporating the solvent at or above 110° Fahrenheit.

3. A new paper-coating comprising a calcium salt, wax and casein which has been dissolved in a volatile alkali.

In testimony whereof I affix my signature in presence of two subscribing witnesses.

FRANCIS X. GOVERS.

Witnesses:
  KATHRYN LA MONTE,
  M. B. MOORE.